United States Patent [19]
Joubert et al.

[11] Patent Number: 5,526,063
[45] Date of Patent: Jun. 11, 1996

[54] VIDEO IMAGE PROJECTOR WITH IMPROVE LUMINOUS EFFICIENCY

[75] Inventors: Cecile Joubert, Paris; Claude Puech, Ballainvilliers; Brigitte Loiseaux, Villebon sur Yvette; Jean-Pierre Huignard, Paris, all of France

[73] Assignee: Thomson-CSF, Paris, France

[21] Appl. No.: 211,347

[22] PCT Filed: Jul. 16, 1993

[86] PCT No.: PCT/FR93/00727

§ 371 Date: Mar. 22, 1994

§ 102(e) Date: Mar. 22, 1994

[87] PCT Pub. No.: WO94/03019

PCT Pub. Date: Feb. 3, 1994

[30] Foreign Application Priority Data

Jul. 24, 1992 [FR] France ................... 92 09162

[51] Int. Cl.⁶ .................................................. H04N 9/31
[52] U.S. Cl. ........................... 348/744; 348/750; 348/759; 348/751; 348/761
[58] Field of Search ............................ 348/744, 750, 348/751, 758, 759, 761, 766, 790, 798, 799; 358/60; 359/204; H04N 9/31

[56] References Cited

U.S. PATENT DOCUMENTS

| 3,507,984 | 4/1970 | Stavis | 348/750 |
|---|---|---|---|
| 4,145,712 | 3/1979 | Spooner et al. | |
| 4,150,396 | 4/1979 | Hareng | 348/751 |
| 4,229,072 | 10/1980 | Torok | 348/751 |
| 4,882,617 | 11/1989 | Vriens | 348/751 |
| 5,148,285 | 9/1992 | Nakane | 348/750 |
| 5,255,082 | 10/1993 | Tamada | 348/750 |
| 5,317,348 | 5/1994 | Knize | 348/750 |

FOREIGN PATENT DOCUMENTS

| 0322070 | 12/1988 | European Pat. Off. . |
|---|---|---|
| 0367332 | 10/1989 | European Pat. Off. . |
| 4102954 | 1/1991 | Germany . |
| 1128689 | 5/1989 | Japan . |
| 64186407. | 5/1991 | Japan . |
| 411492 | 1/1992 | Japan . |

OTHER PUBLICATIONS

Schedule A: List of related cases by Assignee.

*Primary Examiner*—Safet Metjahic
*Assistant Examiner*—Sherrie Hsia
*Attorney, Agent, or Firm*—Roland Plottel

[57] ABSTRACT

A three-color image projector, of the type using several colored light beams with primary colors, with improved luminous efficiency. The projector employs spatial rather than temporal beam modulation. The projector includes a generator producing light in the three spectral bands corresponding to the primary colors (red, green, blue). The generator has at least two light sources (S1, S2), one of which produces multi-spectral band light, and the other is a monochromatic source. By comparison with the prior art, where the white light is produced by a single source, this arrangement avoids, in particular, the elimination of a significant quantity of lumens in the excess primary color.

14 Claims, 5 Drawing Sheets

VIDEO IMAGE PROJECTOR WITH IMPROVE LUMINOUS EFFICIENCY

BACKGROUND OF THE INVENTION

1. Field of the Invention

The invention relates to image projectors, in particular video projectors, using several light beams of different colours to form the image to be projected. It relates especially to means for improving the luminous efficiency of such projectors.

In regard to colour image projection, greater and greater emphasis is being placed on image projection devices which implement techniques of spatial modulation of light. These techniques use electro-optical valves or screens for spatial modulation of light, termed "modulation screens" in the remainder of the description. Spatial modulation of light is to be understood to mean that a beam is projected globally onto the whole surface of an image to be projected, as opposed to temporal, or time, modulation systems in which a slender pencil of light (corresponding to an image point only rather than to the whole image) is modulated temporally at the same time as it scans the surface of a projection screen.

A spatial modulation screen usually consists of a screen of the LCD type (Liquid Crystal Display) comprising a matrix layout of liquid crystal cells, each cell corresponding to an elementary image area or pixel.

The polychrome image can be obtained either with the aid of three modulation screens each forming a monochrome image of one of the three primary colours red, green and blue, or from a single three-colour modulating screen, that is to say a modulating screen furnished with filters coloured according to the three primary colours.

In the case of projectors using a single three-colour modulation screen, at least three neighbouring elementary image areas constitute a three-colour pixel. Each of these three elementary areas corresponds to one of the primary colours, red, green and blue depending on the colour of the filter assigned thereto.

The solutions using a single three-colour modulation screen are well known, and they have the advantage of being particularly simple. On the other hand, they lead to a loss of brightness by a factor of at least three in each of the three chromatic components, this loss being imposed through the spatial distribution of the colour filters.

In the case of projectors using three modulating screens each forming a monochrome image, each modulating screen spatially modulates a beam of light coloured in accordance with a primary colour, and the polychrome image is obtained by superimposing the three monochrome images on a projection screen.

The images formed by the three modulating screens are projected onto the projection screen with the aid of a single objective which is common to the three monochrome images, or else with the aid of three objectives. The coloured beams of the various primary colours, are obtained from a single beam of white light produced by a light source termed the "white lamp", behind which are placed colour filters. Generally the white lamps used are of the arc lamp type, and more especially of the halogen type which exhibits a good luminous yield.

2. Description of the Prior Art

FIG. 1 shows diagrammatically a conventional colour image projector of the type with three modulating screens as defined above.

The projector includes a source of white light SL formed by an arc lamp 1 arranged at the focus of a reflector 2. This arrangement gives rise to a beam of white light FB of small divergence, propagating towards a modulating assembly with three modulation screens ER, EG, EB each intended to form an image having one of the primary colours; this assembly has reflecting mirrors MR1, MR2 and dichroic mirrors MD1 and MD4 with the aid of which the beam of white light FB is split into three coloured beams FPR, FPG, FPB whose spectral band corresponds to one of the primary colours red, green and blue. The dichroic mirrors are wavelength-selective mirrors, that is to say they transmit a certain spectral range and reflect the complementary range.

The three coloured beams each pass through a modulating screen ER, EG, EB by which they are modulated. They are later superimposed on the same axis along which they propagate towards a projection objective OP. They pass through this projection objective OP, and the monochrome image which they each carry is projected onto a projection screen EP. The superimposing of the three monochrome images produces the three-colour image.

Represented in the figure are field lenses LC which, in a conventional manner, are arranged in the vicinity of each modulation screen ER, EG, EB. It should furthermore be noted that modulation screens of the LCD type act on the direction of polarization of the light, and consequently the light which passes through them must be polarized. A polarizer and an analyser (which are not shown), arranged respectively upstream and downstream of the modulation screen, are therefore generally required for each modulation screen.

The colour image projectors of the type using one or more screens for spatial modulation of light are of interest, in particular for their compactness, by comparison with the techniques using cathode-ray tubes. However, these projectors with modulation screens have the disadvantage of exhibiting poor luminous yield.

Indeed, in nevetherless the most favourable case of a projector with three modulation screens, the overall transmission of light is commonly estimated at around 1%, which means that only 1% of the light produced by the white light source SL leaves the projection objective OP.

The inventors have noticed that, in respect of a non-negligible share, this poor luminous yield was attributable to the lamp itself serving to produce the light, bearing in mind the necessity to comply with a given colour balance between the three primary colours, red, green and blue, which colour balance is imposed by the sensitivity curve of the eye. The lamps used are generally arc lamps of the "metal halide" type, which exibit a high luminous yield in lumens per watt. However, one of the main disadvantages of these lamps is that their emission spectrum is never strictly adapted to the colorimetry requirements, they are generally lacking in lumens in one or even two of the three primary colours.

It should be noted in this regard, that the manufacture of these arc lamps poses problems, particularly, for the obtaining, with good efficiency, of an emission spectrum compatible with the production of lumens in the three primary colours.

It may be observed ordinarily, that to obtain the colour balance between the three primary colours, there is occasion to eliminate a certain quantity of lumens from the excess primary. This results in a significant reduction in the luminous yield.

With a view to increasing the luminous efficiency of three-colour image projectors using a light beam passing through a spatial modulation system, the invention proposes to produce the light, in the three spectral bands corresponding to the three primary colours, with the aid of at least one monochromatic source. Two types of preferential embodiment are envisaged: in one, three monochromatic sources corresponding to the desired primary colours are used, each in conjunction with a respective spatial modulation screen. In another advantageous embodiment, the light source used will be a white light source with which is associated a source of monochromatic light with a primary colour wavelength for which the spectrum of the white source is especially deficient.

Up till now, it has always been considered that a source of monochromatic light, in practice a source of coherent light (laser) was suited solely to carrying out projection by temporal modulation and beam scanning over the projection screen. Indeed, the usual property of coherent monochromatic sources is the concentrating of their beam onto a very small section, which makes them especially suited to screen scanning and, conversely, ill-adapted to global projection by spatial modulation.

The U.S. Pat. No. 4,145,712 describes an image projection system with two lasers, with temporal modulation and screen scanning.

The Patent EP 0 322 070 describes a combination of three light sources with spectra centred on the blue, green and red portions respectively of the visible spectrum. These sources are not monochromatic.

It is now well known how to produce monochromatic sources of non-negligible spatial spread which may lend themselves advantageously to projection with spatial modulation, something which was not a priori conceivable with the usual monochromatic sources owing to their narrow pencil.

SUMMARY OF THE INVENTION

The invention therefore proposes, in order to improve the overall luminous yield of a spatial-modulation projection system, to use one or more monochromatic sources.

Thus for example, the use of a supplementary red light source allows the blue and green parts of the spectrum of the arc lamps to be used to the best advantage from a colorimetric point of view.

More generally, the adding of a source, for example red or green or blue, allows greater freedom in the choice of white sources which, hitherto, were chosen exclusively by reference to the trichromatic character of their spectrum. Accordingly, this may also result in a simplification in the manufacture of lamps, since their emission spectrum need no longer exhibit such a wavelength spread.

In the case where three sources are used, corresponding to three primary colours, the sources are truly monochromatic and coherent sources (lasers); in the case where a white lamp and a complementary monochromatic coloured source are associated, the coloured source is preferably a monochromatic and coherent source, but it may be also be envisaged as being a coloured source with strong spectral dominant in the desired primary colour without however being a laser source: electroluminescent or superluminescent diodes might perhaps be suitable.

The advantage afforded by the use of a supplementary source of monochromatic and coherent light is that, in addition to the improvement related to the colour balance, the light transmission of the protector in the relevant red, or blue, or green, channel can be improved by a factor of the order of 10 for the same emitted luminous power.

It should be noted that the invention applies equally to the case where the spatial modulation of light is effected with a single polychrome modulation screen (screen furnished with colour filters), as in the case of projectors using one modulation screen per primary colour.

The invention therefore relates to an image projector including at least one screen for spatial modulation of light, a light generator producing light in at least three spectral bands each corresponding to one of the three so-called primary colours, characterized in that the light generator includes at least two light sources for producing the light of the various spectral bands, one of the sources at least being monochromatic. Preferably, there are three monochromatic sources and these sources are preferably coherent.

The invention also relates to an image projector including at least one screen for spatial modulation of light, a light generator producing light in at least three spectral bands each corresponding to one of three so-called primary colours, characterized in that the light generator includes a white source and at least one essentially monochromatic source in a colour for which the spectrum of the white source is deficient. Here again, the monochromatic source is preferably a coherent source.

BRIEF DESCRIPTION OF THE DRAWINGS

The invention will be better understood on reading the description which follows, given by way of example with reference to the attached figures among which.

DETAILED DESCRIPTION OF THE PREFERRED EMBODIMENTS

Figure 1:
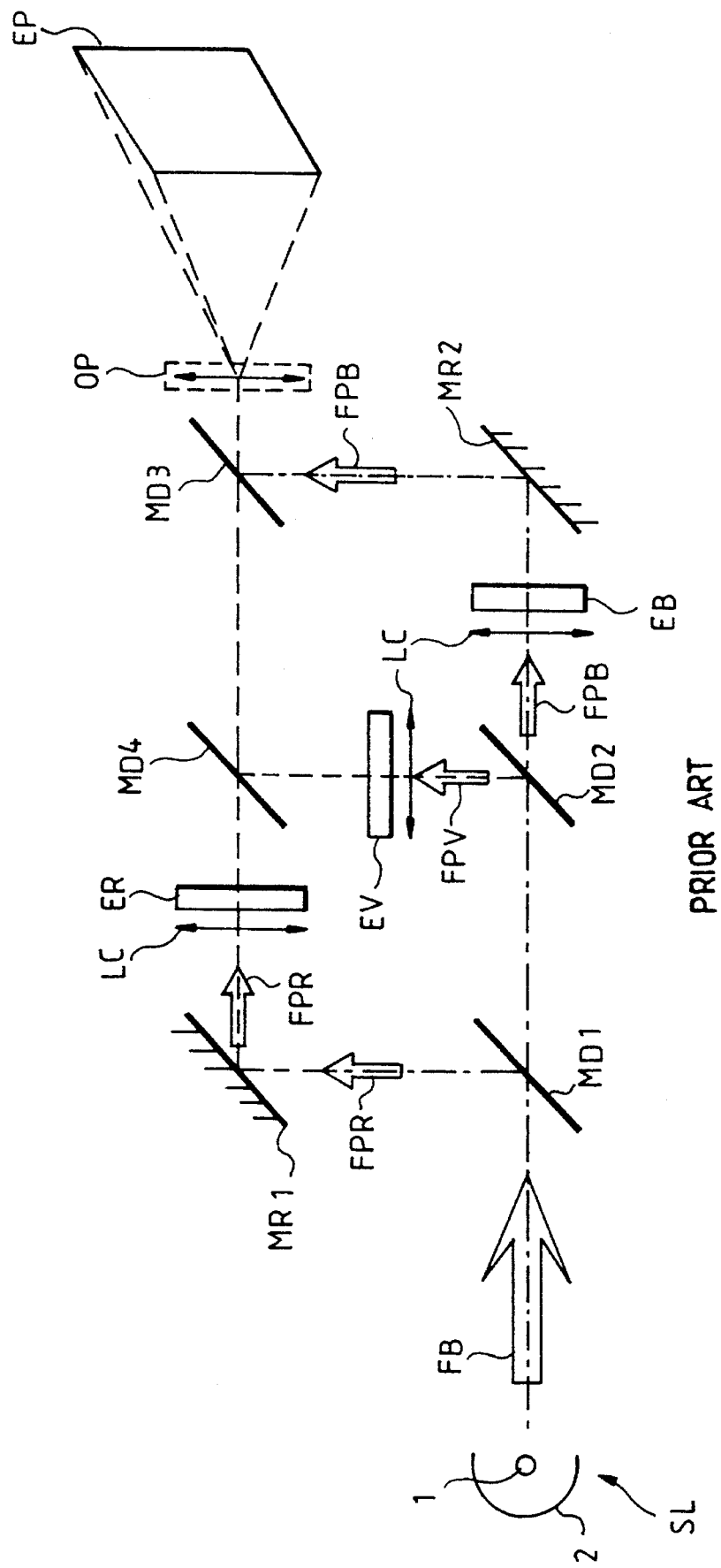
FIG. 1, already described, shows diagrammatically a colour image projector of a conventional type.
Figure 2:
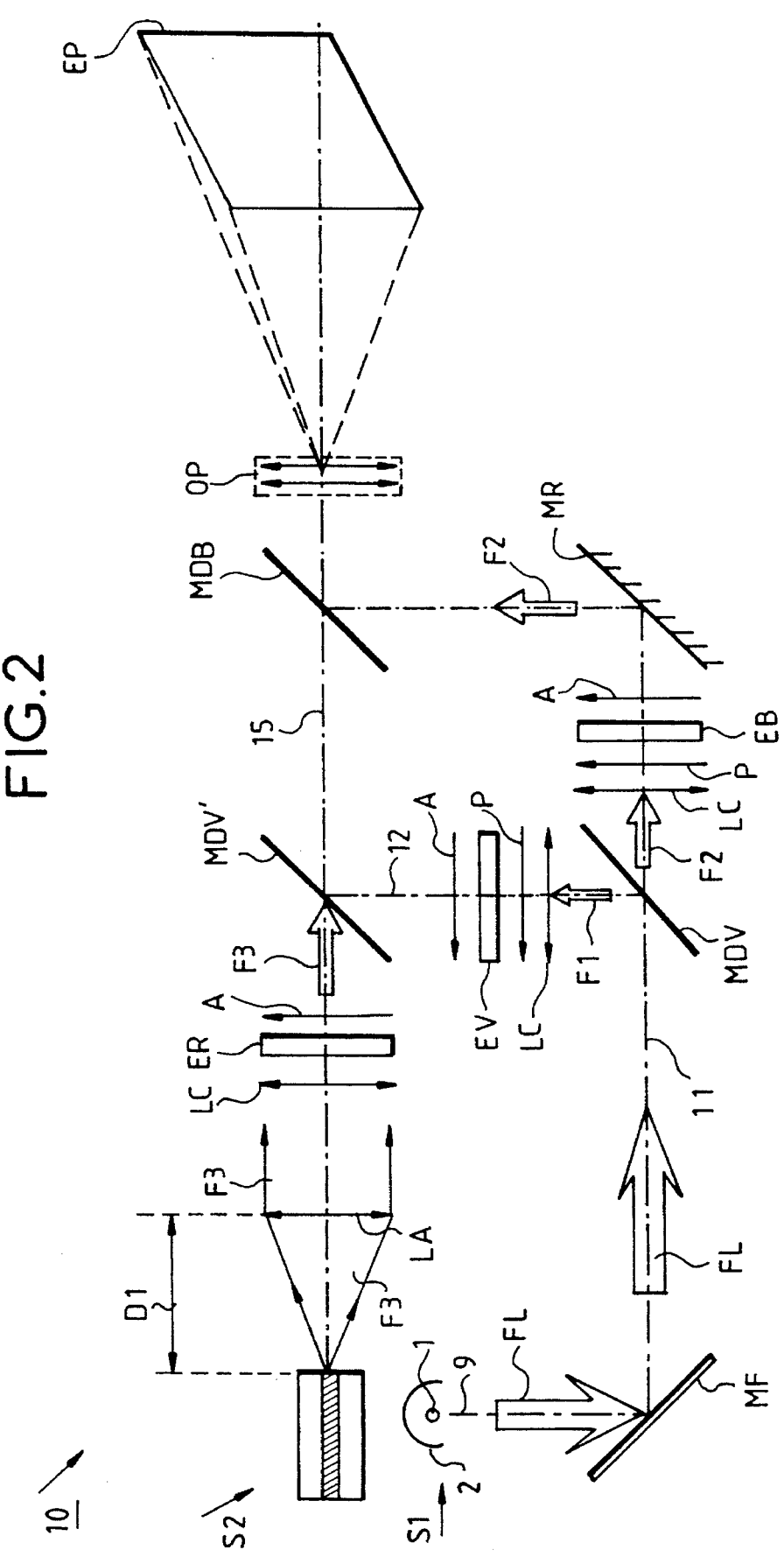
FIG. 2 shows diagrammatically one embodiment of the invention, applied to an image projector of the type using several modulation screens where a beam produced by a supplementary source of light contributes only to the lighting of the corresponding modulation screen.

FIG. 2 represents a three-colour image projector 10 according to the invention.

In the example shown in FIG. 2, the image projector 10 includes three screens for spatial modulation of light EG, EB, ER, each one provided so as to produce a monochrome image in one of the primary colours, green, blue and red; the modulation screens are for example liquid crystal matrix screens, in themselves conventional. Accordingly, each modulation screen EG, EB, ER is lit by an appropriate coloured beam: the first modulating screen EG modulates the green, it is lit by a first light beam F1 or coloured beam corresponding to the colour green; the second modulating screen EB modulates the blue, it is lit by a second coloured beam F2 whose spectral band corresponds to blue; the third modulating screen ER modulates the red, it is lit by a third coloured beam F3 corresponding to red.

According to one characteristic of the invention, the light of the various spectral components of the three coloured beams F1, F2, F3, is produced with the aid of a generator comprising at least two light sources S1, S2.

In the non-limiting example described, one of the light sources produces the light of one of the coloured beams, and the other source produces light constituting the other two coloured beams: in the example represented, the first source S1 produces the light serving to form the first and second coloured beams F1, F2 (coloured green and blue respectively), and the second source S2 is a supplementary source which produces the (red) light forming the third coloured beam F3. Of course, within the spirit of the invention, the second source S2 could produce a light of a different primary colour, blue for example, so that the first source S1 would produce the light corresponding to green and to red.

According to the invention, the second source S2 is a source of essentially monochromatic and preferably coherent light. In the non-limiting example described, the second source S2 is a semi-conductor laser diode emitting in the red, for example at 625 nanometers.

The first source S1 consists for example of an arc lamp 1 situated at the focus of a parabolic reflector 2, so as to produce a light beam FL with parallel rays, which may be a beam of white light. However, in the invention, the red component being provided by the second source S2, the first source S1 can exhibit a very pronounced deficiency in the red since the red which it emits will not be predominant in lighting the third modulating screen ER.

The beam of white light FL is emitted by the first source S1, along an axis 9, towards a mirror MF of the cold mirror type, moreover providing for an ultraviolet filter function. The cold mirror MF reflects the white light beam FL along the second axis 11 of propagation, towards a dichroic mirror MDG acting on the green component. Under the action of the dichroic mirror MDG, the white light beam FL is split into two coloured beams, one of which is the first coloured beam F1 corresponding to the green component, and the other the second coloured beam F2 containing the blue component.

The first coloured beam F1 is reflected towards the first modulating screen EG, along a third axis 12 perpendicular to the second axis 11 of propagation of the white light beam FL. The second beam F2 propagates towards the second modulating screen EB, along the same axis 11 as the white light beam FL.

Before reaching the first and the second modulating screen EG, EB, respectively, the first and the second beam F1, F2 each pass, in a manner in itself conventional, through a field lens LC and through a polarizer P.

Recall that, for modulating screens of the liquid crystal matrix type (L.C.D.), the electro-optical effect in the liquid crystal necessitates working with polarized light. The light originating from the first light source S1 having no particular direction of polarization, the appropriate direction of polarization is imparted through the interposition of a polarizer P which allows through only the light having the chosen direction of polarization.

The coloured beams F1, F2 are modulated by their passing through modulating screens EG, EB and this modulation is evidenced, that is to say revealed, with the aid of an analyser A arranged behind each modulating screen EG, EB. It should be noted that in this case the analysers generally consist of polarizers.

After having passed through the first modulating screen EG and the analyser A, the first coloured beam F1 propagates towards a second dichroic mirror MDG' which is active for the green part of the spectrum. This second dichroic mirror MDG' reflects the first coloured beam F1 through 90°, onto a fourth axis termed the optical axis 15, towards a third dichroic mirror MDB which is active for the blue part of the spectrum. This third dichroic mirror MDB is itself followed, on the optical axis 15, by a projection objective OP.

After having passed through the second modulating screen EB and the analyser A, the second coloured beam F2 propagates towards a reflecting mirror MR by which it is reflected towards the third dichroic mirror MDB. The second coloured beam (blue) F2 is next reflected by the third dichroic mirror MDB towards the projection objective OP, along the optical axis 15.

The third dichroic mirror MDB being sensitive to blue, the first coloured beam (green) F1 passes through it, undergoing attenuation only. The first and the second coloured beams F1, F2 are thus superimposed on the optical axis 15 and propagate towards the projection objective OP.

In the non-limiting example described, the second source S2 is arranged so that the optical axis 15 constitutes the axis of propagation of the third coloured beam F3. This third beam F3 (red) is formed by divergent rays which are made parallel, with the aid of an adaptation lens LA, in itself conventional. The distance D1 between the adaptation lens LA and the second source S2, corresponds to the distance required to impart to the third coloured beam F3 a cross-section sufficient to fully light the third modulating screen ER. The third coloured beam F3 formed by parallel rays propagates towards the third modulating screen MR which it encounters after passing through a field lens LC. Having been modulated by the third screen of the modulator ER, the third coloured beam next passes through an analyser A (as in the case of the first and second coloured beam F1, F2), and it propagates towards the projection objective OP which it reaches after having passed through the second and third dichroic mirrors MDG' and MDB respectively sensitive to the green component and to the blue component.

The three coloured beams F1, F2, F3 are then carriers of a monochrome image of one of the primary colours. They are then superimposed on the optical axis 15 and are projected by the projection objective OP onto a projection screen EP.

The superimposing on the projection screen EP of the three colours green, blue and red, gives rise to white, if the appropriate colour balance is complied with.

Let us consider the case for example where the red monochromatic primary colour is chosen at 625 nanometers as mentioned earlier, and where the blue and green primaries are extracted from the spectrum of an arc lamp, with the following trichromatic coordinates (these coordinates being established in a conventional manner so as to be plotted in a colour chart defined in accordance with the norms of the International Committee on Lighting):

| Red   | 0.7   | 0.23  |
|-------|-------|-------|
| Green | 0.245 | 0.73  |
| B     | 0.161 | 0.014 |

Under these conditions, by superimposing 2.5 lumens of red, 12 lumens of green and 0.5 lumens of blue, 15 lumens of white are obtained for example. The visual lumens $P_L$ are converted into energy watts $P_w$ through the formula:

$$P_w = P_L/K.V(\lambda), \text{ where } K = 683 \text{ lm/W}$$

and where $V(\lambda)$ is the sensitivity curve of the eye.

In order for the colour balance to be complied with, it is necessary, with the invention, to adjust separately the power delivered by the supplementary source or second source S2, that is to say the power in the red in the example, with respect to the maximum green and blue power delivered by the white lamp or first source S1.

In the prior art, the white lamp has an emission spectrum in the whole of the visible, and the colour balance is achieved a posteriori through reduction of the excess primaries. No adjustment in respect of the emission spectrum is possible, and a non-negligible quantity of light is lost.

With the invention there is therefore an improvement in the luminous yield which is obtained by virtue of the essentially monochromatic source S2.

Indeed, for each of the blue and green channels whose light is produced by the first source S1 consisting of an arc lamp, the overall transmission of the projector results, among other things, from the various transmission coefficients listed below:

— the reflector 2 used in the source S1 exhibits a transmission coefficient of the order of 0.25;

— a device (not shown) with UV and IR filters, whose transmission coefficient is of the order of 0.9, is generally interposed in the path of the light provided by a light source such as the source S1;

— a dichroic mirror with a transmission coefficient of the order of 0.8;

— a polarizer P with a transmission coefficient of the order of 0.4.

With the set-up of the invention, the transmission over the channel using the second source S2 is greatly improved especially for the following reasons:

— the yield of the dichroic mirrors is better for monochromatic and slightly divergent radiations than for radiations having spread-out spectral bands (several tens of nanometers) and a greater angular divergence (of the order of ±4°). The transmission coefficient of a dichroic mirror is estimated at around 0.9 in the case of monochromatic light.

— The second source S2 may be of a conventional semiconductor type, producing light having a direction of polarization "directly". In this case it is not necessary to arrange the polarizer P in front of the modulating screen, as in the example shown in FIG. 2 for the modulating screen ER for the red channel. Losses in the polarizer are thereby avoided. Moreover, the collecting of the light is more efficient when the light is monochromatic and coherent.

Thus, it may reckoned, that overall, the monochromatic and coherent character of the light emitted by the second source S1 brings about an improvement in luminous transmission by a factor 10, in the relevant channel, namely "red" in the example. Going back to the example given above for the "red" channel at 625 nanometers, 2.5 lumens of red are equivalent to about 11 mW. Bearing in mind a transmission factor in the "red" channel now estimated at 10%, optical power of around 110 mW of red must be emitted to obtain 15 lumens of white on the projection screen EP, whereas in the prior art, about 1 watt of red would be necessary.

The foregoing description of the invention is given with reference to image projectors using three modulation screens lit by beams of different colours. However, the invention can be applied also to the case of projectors using a single three-colour modulation screen (using colour filters), lit by a white light beam, as illustrated by FIG. 3.

Figure 3:
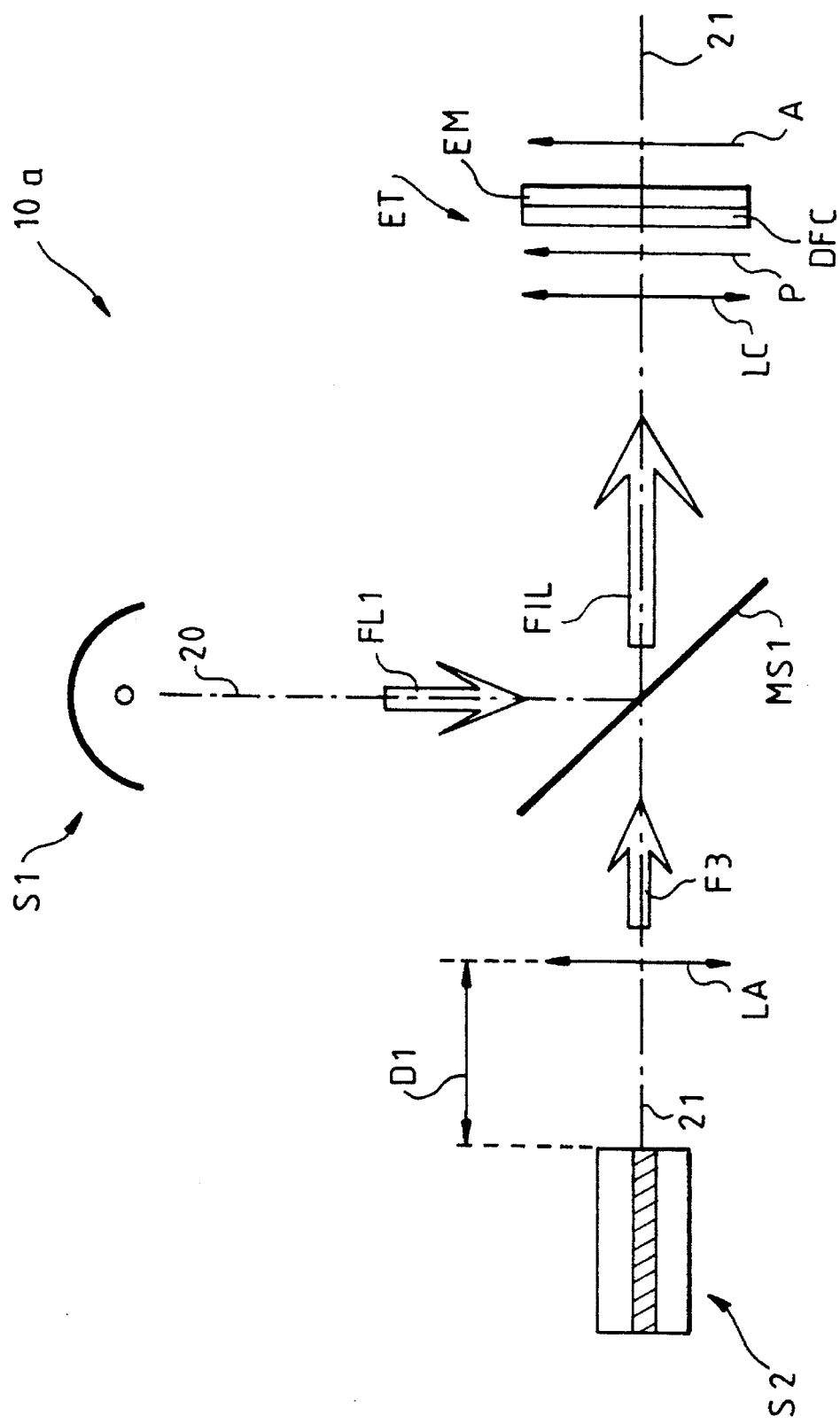
FIG. 3 shows diagrammatically one version of the invention in which the beams produced by two light sources shown in FIG. 2 are superimposed in order to light jointly the corresponding modulation screen or screens.

FIG. 3 represents partially a three-colour image projector 10a using two light sources S1, S2 according to the invention, to light a single modulation screen EM associated with a colour filter device DFC, so as to constitute a three-colour modulating screen ET. Of course, the modulating screen EM may in itself be of a type similar to the modulating screens of the previous examples.

The sources S1, S2 may have the same characteristics as in the case of the example of FIG. 2, for example, on the one hand the first source S1 may consist of an arc lamp, producing a white light beam FL1 having a very pronounced deficiency in the red; and, on the other hand, the second source S2 may be a semiconductor laser diode emitting in the red, that is to say producing the coloured beam F3 red in colour. If course, in the latter case also, the second source S2 could produce light of a different primary colour, blue for example, so that the first source S1 would produce mainly the light corresponding to green and to red.

The white light beam FL1 and the coloured beam F3 are emitted respectively along mutually perpendicular first and second axis 20, 21.

As in the example of FIG. 2, the red coloured beam F3 passes through an adaptation lens LA situated at a distance D1 from the second source S2 so as to impart to the coloured beam F3 substantially parallel rays and a cross-section sufficient to fully light the three-colour modulation screen ET.

The two beams FL1 and F3 propagate towards the same dichroic mirror MS1, the function of which is to superimpose these two beams, so as to obtain a single beam containing the spectral bands of the three primary colours.

The dichroic mirror MS1 is a wavelength-selective mirror of a type in itself conventional, consisting for example of superimposed dielectric layers. It is produced so as, on the one hand, to transmit the wavelengths of the coloured beam F3 produced by the second source S2, and so as, on the other hand, to reflect the beam FL1 produced by the first source S1. In the example described where the coloured beam F3 is red and centred at a wavelength $\lambda_r$ of 660 nanometers for example, the wavelengths of the beam FL1 lying for example between 470 and 680 nanometers, the cut-off wavelength $\lambda_c$ of the dichroic mirror MS1 must be somewhat below the red wavelength $\lambda_r$, so as for example to reflect all the components of the beam FL1 which are below 660 nanometers, and to transmit the coloured beam F3 in respect of its share above the cut-off wavelength $\lambda_c$. All the energy of the first source S1 lying between 600 nanometers and 660 nanometers can thus be used to light the three-colour modulating screen ET.

The coloured beam F3 being transmitted, it preserves its axis of propagation 21 which constitutes a principal axis on which the three-colour modulating screen ET is arranged.

The dichroic mirror MS1 is arranged so as to reflect along the principal axis 21 the beam FL1 originating from the first source S1, so that this beam FL1 is superimposed, on this principal axis, on the coloured beam F3. The two beams FL1, F3 propagating in the same direction, they are thus bundled together and constitute the same so-called illumination beam FIL containing the three spectral bands corresponding to the primary colours red, green and blue. The illumination beam FIL propagates towards the modulation screen ET at which it arrives after being passed successively through a field lens LC, a polarizer P, and then the colour filter device DFC symbolized in FIG. 3 by a rectangle. In fact, such a device generally comprises filters (not shown) of red, green and blue colours, each filter being arranged in front of the elementary image area (not shown) which corresponds to its colour; accordingly, the modulation screen EM and the filter device DFC form a three-colour modulating screen, as opposed to the case of FIG. 2 where each modulation screen produces a monochrome image.

The illumination beam FIL having been modulated by the modulation screen EM, it next passes through an analyser A and propagates towards a projection objective and towards a projection screen (not shown in FIG. 3).

Figure 4:
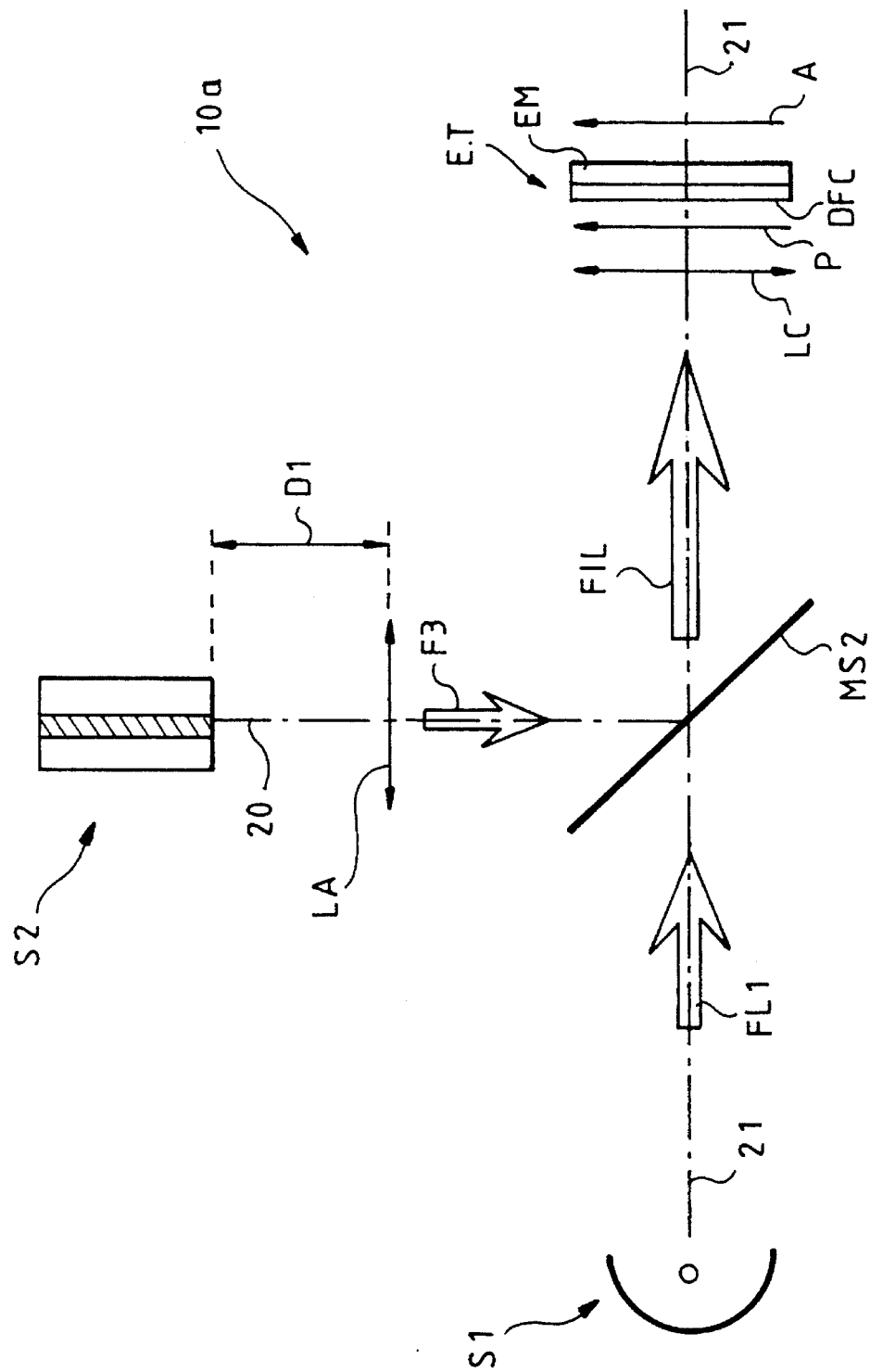
FIG. 4 represents another version relating to the superimposing of the beams produced by the two light sources shown in FIG. 2.

FIG. 4 illustrates another way of producing the superposition, on the same axis of propagation, of the light beams FL1 and F3 produced by the first and the second light source S1 respectively. The purpose is to construct a single illumination beam FIL containing, as in the case of the previous example, the three spectral bands corresponding to the primary colours, in ratios which are favourable to colour balance.

The difference between this version and the previous version shown in FIG. 3 lies in the fact that in this version it is the beam F3 coloured red, produced by the second source S2, which is reflected by the dichroic mirror labelled MS2, and consequently the light beam FL1 emitted by the first source S1 is transmitted by this dichroic mirror MS2.

Indeed in this version, the first source S1 is situated on the principal axis 21 as also is the three-colour modulating screen ET, whereas the second source S2 is on the axis 20 perpendicular to this principal axis. Under these conditions the dichroic mirror MS2 must be embodied so as, on the one hand, to reflect the beam F3 colored red, the central wavelength of which is for example at 660 nanometers as in the previous example; and, on the other hand, so as to transmit, at least partially the beam FL1 lying between 470 and 680 nanometers.

One advantage of this version arises from the fact that the dichroic mirror MS2 can be embodied, in a manner in itself conventional, so as to be reflective (with regard to the coloured beam F3 in the example of FIG. 5) for a relatively narrow wavelength band. Accordingly, the wavelength band which is not transmitted (in the white light beam FL1) by the dichroic mirror MS1 is itself narrow. This possibility, offered by dichroic mirrors, of being able to exhibit a narrow bandpass function, is well known.

Under these conditions, the red lumens contained in the light beam FL1 can be transmitted by the dichroic mirror MS2, in respect of the share which does not lie within the spectral band for which the dichroic mirror MS2 is reflective. This allows wider latitude in regard to the choice of laser wavelength, which laser wavelength may be situated anywhere in the red spectrum, right in the middle for example, rather than at the end of this spectrum as in the previous example.

It should be noted that the superimposing of the light beams FL1, F3 effected by the various sources S1, S2 with a view to forming a single illumination beam FIL, can be applied advantageously also to the lighting of three monochrome modulation screens, by splitting the illumination beam FIL into three monochrome beams in accordance with techniques in themselves conventional.

Figure 5:
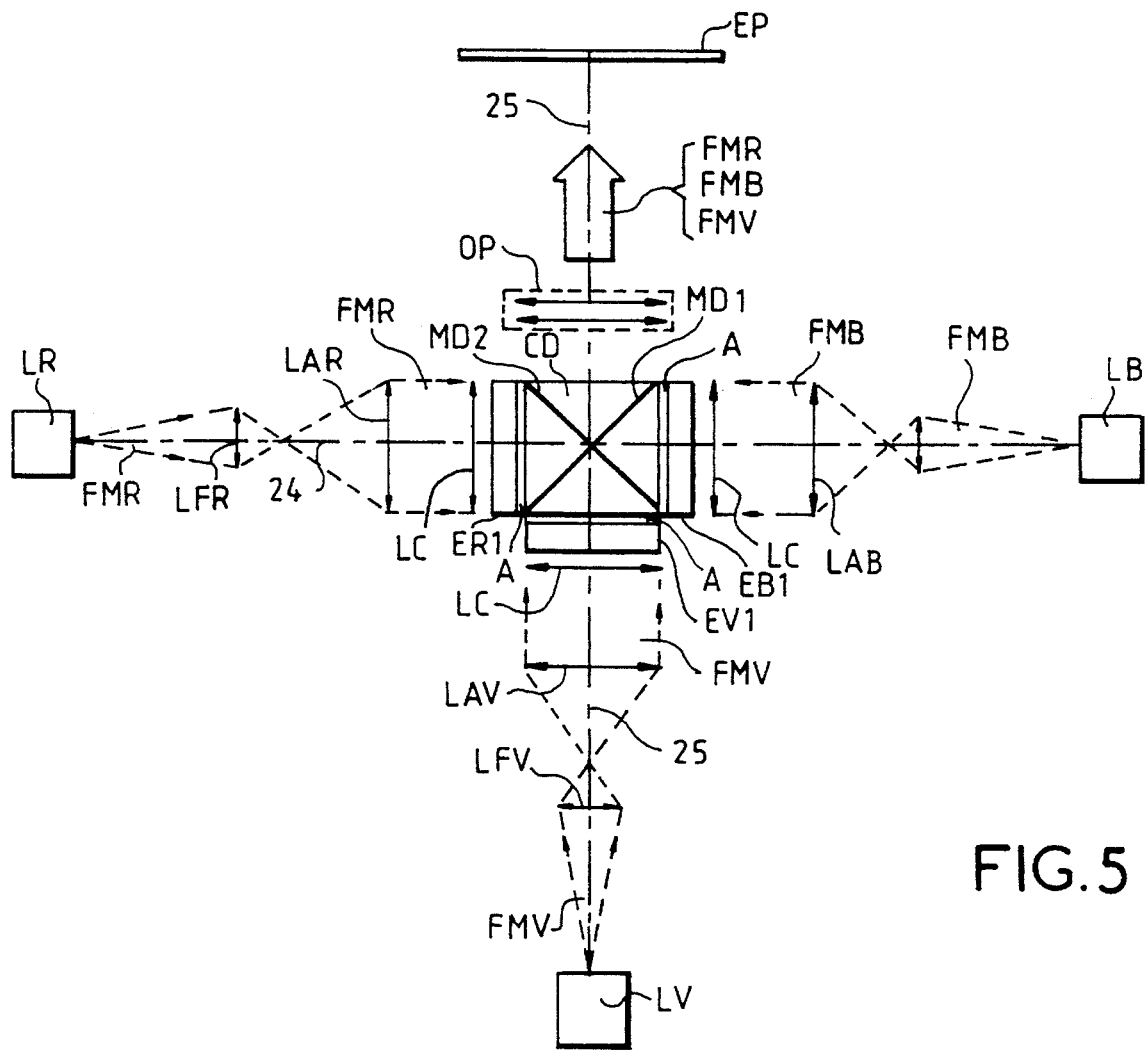
FIG. 5 represents another embodiment of a three-colour image projector according to the invention, using a monochromatic and coherent light source for each primary colour.

FIG. 5 shows diagrammatically the architecture of a three-colour image projector using, according to the invention, a respective monochromatic laser source LR, LG, LB for each primary colour red, green and blue.

A laser source LR produces a polarized monochromatic beam FMR corresponding to the red primary colour. The red monochromatic beam propagates along an axis 24, towards a focussing lens LFR, the action of which makes it convergent and later divergent. After journeying over an extension distance which is useful for imparting to the red beam FMR dimensions which are sufficient to light a modulation screen, the red beam passes through an adaptation lens LAR which imparts parallel rays thereto. The red beam next propagates towards a field lens LC, and then towards a modulation screen ER1 of the liquid crystal matrix screen (LCD) type for example, intended to produce a red monochrome image. The red beam next passes through an analyser A and then enters a dichroic cube CD which includes a dichroic mirror MD1 sensitive to red, by which mirror it is deflected onto a so-called projection axis 25 perpendicular to the propagation axis 24.

A polarized monochromatic beam FMB corresponding to the blue primary colour is delivered by a laser source LB. The blue beam FMB propagates along the axis 24 towards the dichroic cube CD, that is to say in the direction opposite to the red beam FMR, the blue beam FMB encounters, in succession, a focussing lens LFB, an adaptation lens LAB, a field lens LC, a modulation screen EB1, an analyser A, the actions of which on the blue beam FMB are the same as those exerted by the corresponding elements for the red beam FMR. The blue beam FMB next enters the dichroic cube CD where it encounters a second dichroic mirror MD2 sensitive to the blue component. In a manner in itself coventional, the two dichroic mirrors are inset in perpendicular planes, so that the blue beam FMB is reflected onto the projection axis 21.

Lastly, a polarized monochromatic beam FMG corresponding to the green primary colour is delivered by a laser source LG. It propagates along the projection axis 25, towards the dichroic cube CD, passing in succession through a focussing lens LFG, an adaptation lens LAG, a field lens LC, a modulation screen EG1 and an analyser A, the actions of which are the same as those exerted by the corresponding elements for the beams FMR and FMB.

The green beam FMG passes through the dichroic cube CD without undergoing reflection, so that it propagates along the projection axis 25, with the red and blue beams FMR, FMB, towards a projection objective OP. The three beams FMR, FMB, FMG, each possibly carrying a monochrome image, are next projected onto the projection screen EP.

This configuration has the advantage, on the one hand, of being very compact, and, on the other hand, of greatly improving the luminous efficiency. Indeed, it may be remarked that this configuration uses only two dichroic mirrors MD1, MD2 to superimpose the beams, and requires no dichroic mirror to separate the spectral components since the three primary colours are provided by different sources. It must be remarked that this decrease in the number of dichroic mirrors has a beneficial action in regard to the bulk, luminous efficiency and complexity of the image projector. In fact, in the version of the invention shown in FIG. 3, a luminous transmission ratio of the order of 12% is obtained overall for the three channels red, green and blue.

It should be noted that it is also possible to illuminate a single three-colour modulating screen, with the spectral components corresponding to the three primary colours, using a configuration similar to that described with reference to FIG. 5, that is to say by using three sources LG, LR, LB each producing the light of a coloured beam in one of the primary colours. The three coloured beams can next be superimposed with the aid of two dichroic mirrors MD1, MD2 which are crossed, as in the example of FIG. 5, so as to produce a white light beam capable of illuminating a three-colour modulating screen.

This description of the invention has been given by way of non-limiting example, with reference to image projections of the front-projection type, but it is clear that the invention applies equally well to the case of rear-projectors.

We claim:

1. A color image projector comprising a generator of light for producing three color beams each corresponding to a primary color, three imagers for respective spatial modulation of said color beams, means for impinging each color beam on a whole useful surface of a respective imager so as to spatially modulate light in said beam, and means for impinging said color beams on a viewing screen after said color beams have gone each through said respective imager, wherein said generator of light comprises at least one laser source globally illuminating one of said imagers with light emitted by said laser source.

2. A color image projector according to claim 1, wherein the light generator comprises three laser sources, each emitting a respective primary color.

3. A color image projector according to claim 2, wherein said laser sources are laser diodes.

4. A color image according to one of claims 1 to 3, further comprising two wavelength selective mirrors (MD1, MD2) arranged so as to superimpose the three color beams on a same axis of propagation.

5. A color image projector including a light generator for producing a primary beam, means for separating the primary beam into three colored secondary light beams each corresponding to a respective spectral band, three imagers for spatial modulation or light each imager adapted to receive and spatially modulate light in a respective secondary light beam, and means for projecting the thus modulated secondary beams onto a viewing screen, said light generator comprises a substantially white light source having an emission spectrum, and at least one essentially monochromatic source having a color for which the emission spectrum of the white light source is deficient.

6. A color image projector according to claim 5, wherein said at least one essentially monochromatic source is a laser source.

7. A color image projector according to one of claims 5 and 6, including means for combining light emitted by said white source and light emitted by said essentially monochromatic source.

8. A color image projector according to claim 7, wherein said means for combining lights comprise at least one color selective mirror, adapted for reflecting selected colors and transmitting other colors.

9. A color image projector according to one of claims 5 and 6, including means for separating light emitted by said white source into two secondary beams each corresponding to the respective spectral band, means for directing each secondary beam on two of the three imagers, and means for directing light emitted by said at least one essentially monochromatic source onto the third of said three imagers.

10. A color image projector according to claim 9, wherein said two secondary beams separated from the light emitted by said white source comprise respectively a green beam and a blue beam, and said at least one monochromatic source is a red source.

11. A color image projector according to claim 5, wherein said white source is an arc lamp.

12. A color image projector according to claim 5, wherein said essentially monochromatic light source comprises a laser diode.

13. A color image projector comprising a generator of light for producing three color beams each corresponding to a primary color and each beam having a predetermined cross-section, three imagers for respectively spatially modulating said three color beams, means for impinging each color beam with a whole cross-section of each beam on a whole surface of a respective imager, whereby said imagers spatially modulate light in said beams, means for impinging said color beams on a viewing screen after said beams have gone through said respective imagers, and said generator comprising at least one laser source which impinges on and globally illuminates said whole surface of the corresponding imager with light emitted by said laser source.

14. A color image projector comprising a light generator for producing a primary beam having a predetermined cross-section and means for impinging said primary beam with a whole cross-section of said primary beam on a whole surface of a single modulation screen associated with a color filter device so as to constitute a three-color modulating screen, whereby said modulation screen spatially modulates said primary beam in accordance with the colors of the filter device, and means for impinging said primary beam on a viewing screen after said beam has gone through said modulation screen, and said light generator comprising at least one laser source and means for globally illuminating said whole surface of said modulation screen with light emitted by said laser source.

* * * * *